United States Patent
Huh

(10) Patent No.: US 8,458,291 B2
(45) Date of Patent: Jun. 4, 2013

(54) SYSTEM AND METHOD FOR OUTPUTTING CONTENTS IN CPNS ENVIRONMENT

(75) Inventor: Hun Huh, Gyeonggi-Do (KR)

(73) Assignee: SK Planet Co., Ltd. (KR)

( * ) Notice: Subject to any disclaimer, the term of this patent is extended or adjusted under 35 U.S.C. 154(b) by 0 days.

(21) Appl. No.: 13/380,084

(22) PCT Filed: Mar. 29, 2011

(86) PCT No.: PCT/KR2011/002132
§ 371 (c)(1),
(2), (4) Date: Dec. 22, 2011

(87) PCT Pub. No.: WO2012/020905
PCT Pub. Date: Feb. 16, 2012

(65) Prior Publication Data
US 2012/0271910 A1  Oct. 25, 2012

(30) Foreign Application Priority Data

Aug. 9, 2010  (KR) ........................ 10-2010-0076323

(51) Int. Cl.
*G06F 15/16* (2006.01)
(52) U.S. Cl.
USPC ............................................ 709/217
(58) Field of Classification Search
USPC ........................................... 709/217
See application file for complete search history.

(56) References Cited

U.S. PATENT DOCUMENTS

| | | | |
|---|---|---|---|
| 6,286,063 B1 * | 9/2001 | Bolleman et al. | 710/62 |
| 2004/0117442 A1 * | 6/2004 | Thielen | 709/203 |
| 2009/0030978 A1 * | 1/2009 | Johnson et al. | 709/203 |
| 2009/0031419 A1 * | 1/2009 | Laksono | 726/21 |
| 2010/0281142 A1 * | 11/2010 | Stoyanov | 709/221 |
| 2011/0287757 A1 * | 11/2011 | Nykoluk et al. | 455/419 |

FOREIGN PATENT DOCUMENTS

| | | |
|---|---|---|
| KR | 102004004859 | 1/2004 |
| KR | 1020040004859 | 1/2004 |
| KR | 1020090076104 | 7/2009 |
| KR | 1020100074435 | 7/2010 |
| KR | 1020100074437 | 7/2010 |

* cited by examiner

*Primary Examiner* — Brian P Whipple
(74) *Attorney, Agent, or Firm* — Baker & Hostetler LLP

(57) ABSTRACT

The present invention relates to a system and method for outputting contents in a CPNS environment, comprising: a user terminal for searching for a contents playback terminal including a wireless communication unit supporting CPNS, sharing the contents with the contents playback terminal by connection to the user terminal through a short-range communication network, decoding corresponding contents in response to a contents playback request received from the user terminal, converting the corresponding contents into frequency modulation ("FM") data, transmitting the converted FM data to a contents output device for demodulating the FM data received from the contents playback terminal and outputting the demodulated FM data in real-time through a contents output device.

17 Claims, 10 Drawing Sheets

SYSTEM AND METHOD FOR OUTPUTTING CONTENTS IN CPNS ENVIRONMENT

TECHNICAL FIELD

The present invention relates to a system and method for outputting contents in a CPNS environment, and more specifically, to a system and method for outputting contents in a CPNS environment, in which 1) a user terminal shares the contents with a contents playback terminal by receiving contents information from the contents playback terminal supporting CPNS and downloading at least one piece previously stored contents to the contents playback terminal, and the contents playback terminal is connected to the user terminal through a short-range wireless communication network and outputs corresponding contents through an external speaker in response to a contents playback request received from the user terminal, or transmits FM data after decoding corresponding contents and converting the decoded contents into the FM data, and then a contents output device demodulates and outputs the FM data.

BACKGROUND ART

Portable audio data players (hereinafter, referred to as MP3 players) capable of playing back digitally encoded audio data are commonly used now. Describing in detail, comparatively small-sized handheld devices capable of processing digitally encoded audio data stored in a semiconductor memory device have become popular.

A variety of contents playback terminals, such as cellular phones, MPEG audio layer-3 (MP3) players, Personal Multimedia Players (PMP), Ultra Mobile Personal Computers (UMPC) and the like, are used as the small-sized handheld devices.

The contents playback terminals described above read audio files recorded and stored in a hard memory, a flash memory, or the like and output high quality audios after processing digital signals.

On the other hand, the contents playback terminals are provided with an interface function capable of connecting to the Internet through a personal computer (PC) and downloading free or paid MP3 audio files provided by Internet websites to obtain contents desired by a user.

Accordingly, since the user may connect to the Internet websites that provide audio files using a PC connected to the Internet and selectively download audio files desired by the user to the PC or to the contents playback terminal connected to the PC, the user having the PC or the contents playback terminal can play back and listen to the audio files desired by the user after downloading the audio files with ease through the Internet.

The contents playback terminal downloads contents desired by the user from the PC and plays back the downloaded contents. However, there is a problem in that the desired contents cannot be downloaded if the user is moving or cannot connect to the PC.

In order to solve the problem, techniques for adding a communication means connectible to a short-range communication network onto the contents playback device, such as a Bluetooth or an ultra-wideband (UWB), have been proposed.

According to the techniques, it is possible to download contents from an external device through the short-range communication network.

However, this method is disadvantageous in that although the contents stored in the external device can be downloaded, since the contents are outputted through a speaker of the contents playback terminal, an abundant sound environment cannot not provided.

Furthermore, when a user listens to and enjoys contents through the speaker of a small-sized contents playback terminal, it is difficult to listen to and enjoy contents of a good quality since output power of the speaker is low.

Furthermore, if a user listens to and enjoys contents such as music stored in the terminal using an earphone or a headphone, it is difficult to share the music with other people staying in the same space such a vehicle, and since a driver is disturbed so as not to concentrate on driving, it may lead to a vehicle accident.

DISCLOSURE OF INVENTION

Technical Problem

Therefore, the present invention has been made in view of the above problems, and it is an object of the present invention to provide a system and method for outputting contents in a CPNS environment, in which contents provided by a user terminal can be outputted through a general external speaker.

Another object of the present invention is to provide a system and method for outputting contents in a CPNS environment, in which contents stored in a user terminal and a contents playback terminal can be shared with each other.

Still another object of the present invention is to provide a system and method for outputting contents in a CPNS environment, in which since contents stored in a user terminal can be downloaded and played back in real-time, limit in capacity of the contents playback terminal can be overcome.

Still another object of the present invention is to provide a contents playback terminal loaded with the CPNS protocol and a contents playback method, in which contents files stored in a smart phone or a PC are wirelessly transmitted to be remotely played back in another medium, and it provides an opportunity to inform the public of the CPNS communication protocol, and thus preoccupation of the market and awareness of the CPNS can be enhanced compared with the other communication protocols (DLNA and the like).

Still another object of the present invention is to provide a system and method for playing back contents in a CPNS environment, in which contents provided by a user terminal can be outputted through a stereo system installed in a vehicle.

Still another object of the present invention is to provide a system and method for playing back contents in a CPNS environment, in which it is possible to listen to and enjoy contents of a high quality as conveniently as listening to music through a radio while driving a vehicle.

Technical Solution

To accomplish the above objects, according to one embodiment of the present invention, there is provided a contents output system comprising: a user terminal for searching for a contents playback terminal supporting CPNS, sharing the contents with the contents playback terminal by receiving contents information from the searched contents playback terminal and downloading at least one piece previously stored contents to the contents playback terminal, and requesting playback of contents selected by a user among the shared contents; the contents playback terminal for sharing the contents with the user terminal by connecting to the user terminal through a short-range communication network, and outputting corresponding contents through a contents output device in response to a contents playback request received from the user terminal; and the contents output device for outputting the contents received from the contents playback terminal.

The contents output system further comprises a remote control device for downloading contents stored in the user terminal and the contents playback terminal to each other or remotely selecting contents desired to be played back.

The contents output device uses an external speaker.

The contents playback terminal decodes corresponding contents in response to the contents playback request received from the user terminal, converts the contents into FM data, and transmits the FM data, and the contents output device demodulates the FM data received from the contents playback terminal and outputs the demodulated FM data in real-time.

The contents playback terminal transmits the FM data at a specific frequency.

According to an embodiment of the present invention, there is provided a user terminal comprising: a wireless communication unit for performing communication through a short-range communication network; a storage unit for storing contents; a terminal search unit for searching for a contents playback terminal supporting CPNS; a contents-share processing unit for sharing the contents with the contents playback terminal by requesting and receiving contents information from the contents playback terminal searched by the terminal search unit and downloading at least one piece the contents stored in the storage unit to the searched contents playback terminal; and a playback request unit for transmitting a request for playing back contents selected by a user among the contents shared by the contents-share processing unit to the contents playback terminal through the short-range communication network.

The terminal search unit receives terminal information from the searched contents playback terminal and manages the received terminal information.

The playback request unit requests playback of the contents downloaded by the contents-share processing unit, requests playback of the contents selected by the user among the contents stored in the storage unit while streaming the contents, or requests playback of contents stored in the contents playback terminal.

According to an embodiment of the present invention, there is provided a contents playback terminal comprising: a wireless communication unit for performing communication through a short-range communication network; a storage unit for storing contents; a download processing unit for downloading contents from a user terminal through the short-range wireless communication unit and transmitting the contents stored in the storage unit to the user terminal so as to share the contents; a decoding unit for decoding contents requested to be played back by the user terminal among the contents shared by the download processing unit; and an output interface unit for transmitting the decoded contents to a contents output device.

The contents output device uses an external speaker, and the output interface unit is a stereo jack interface.

The contents playback terminal further comprises a terminal information providing unit for providing the user terminal with terminal information through the wireless communication unit.

The contents playback terminal further comprises an FM conversion unit for converting the decoded contents into FM data, wherein the output interface unit transmits the FM data converted by the FM conversion unit at a specific frequency.

The decoding unit decodes the contents downloaded or streamed from the user terminal, in real-time.

The FM conversion unit converts the decoded contents into FM data by modulating and demodulating the contents and selectively converts the contents so that the converted FM data may have a frequency band that can be received by a radio, and an FM transmit unit converts the FM data into a high frequency signal in order to wirelessly transmit the FM data on a channel selected by the FM conversion unit, amplifies the converted high frequency FM signal to a predetermined level in order to wirelessly transmit the high frequency FM signal, and transmits the amplified high frequency FM signal.

The contents playback terminal further comprises an input unit for inputting a user command; and a playback unit for decoding and outputting corresponding contents when playback of the contents is requested through the input unit.

If output of the decoded contents through an external speaker is requested, the playback unit outputs the decoded contents through the external speaker connected through the output interface unit, and if output of the decoded contents through an external speaker is not requested, the playback unit outputs the decoded contents through a speaker of its own.

The input unit is provided with a play button, a previous button, a next button, a volume up button, and a volume down button for playing back the contents stored in the storage unit.

The playback unit determines whether or not the contents playback terminal possesses the contents requested to be played back, and if the contents playback terminal possesses the contents requested to be played back, the playback unit extracts corresponding contents from the storage unit and decodes the extracted contents, whereas if the contents playback terminal does not possess the contents, the playback unit downloads the contents from the user terminal and decodes the downloaded contents.

According to an embodiment of the present invention, there is provided a method for outputting contents in a CPNS environment, the method comprising the steps of: (a) searching for a contents playback terminal supporting CPNS, by a user terminal; (b) sharing the contents with the contents playback terminal by receiving contents information from the searched contents playback terminal and downloading at least one piece previously stored contents to the contents playback terminal, by a user terminal; (c) requesting the contents playback terminal to play back contents selected by a user among the shared contents, by the user terminal; (d) decoding the contents requested to be played back, by the contents playback terminal; and (e) outputting the decoded contents through a contents output device, by the contents playback terminal.

The contents output device is configured as an external speaker connected to the contents playback terminal through a stereo jack.

Step (e) includes the steps of: (e1) converting the decoded contents into FM data and transmitting the FM data, by the contents playback terminal; and (e2) demodulating the FM data received from the contents playback terminal and outputting the demodulated FM data, by the contents output device.

Step (e1) includes the steps of: converting the decoded contents into FM data by modulating and demodulating the contents and selectively converting the contents so that the converted FM data may have a frequency band that can be received by a radio; and converting the FM data into a high frequency signal in order to wirelessly transmit the FM data on a selected channel, amplifying the converted high frequency FM data to a predetermined level in order to wirelessly transmit the high frequency FM data, and transmitting the amplified high frequency FM data.

Step (c) requests playback of the downloaded contents, requests playback of the contents selected by the user among the previously stored contents while streaming the contents, or requests playback of contents stored in the contents playback terminal.

Advantageous Effects

According to the present invention described above, contents provided by a user terminal can be outputted through a general external speaker.

Furthermore, contents stored in a user terminal and a contents playback terminal can be shared with each other.

Furthermore, since contents stored in a user terminal can be downloaded and played back in real-time, limit in capacity of the contents playback terminal can be overcome.

Furthermore, if the contents playback terminal is connected to an input port of an existing external speaker, the speaker can be used in the form of an Internet speaker, and thus a user can listen to the contents on the network in a further abundant sound environment.

Furthermore, since contents can be shared among various types of devices through CPNS and played back in real-time, a variety of conveniences can be provided when a user uses the contents.

Furthermore, a user can wirelessly transmit contents files stored in a smart phone or a PC to be remotely played back in another medium, and it provides an opportunity to inform the public of the CPNS communication protocol, and thus preoccupation of the market and awareness of the CPNS can be enhanced compared with the other communication protocols (DLNA and the like).

Furthermore, functions will be diversified and convenience can be enhanced by combining CPNS with DLNA, which is another communication protocol.

Furthermore, if contents stored in a user terminal are frequency-modulated and wirelessly transmitted, a stereo system in a vehicle receives and outputs the frequency-modulated contents, and thus it is possible to listen to and enjoy contents of a high quality as conveniently as listening to music through a stereo system such as a radio or the like while driving the vehicle.

Furthermore, since contents in a terminal supporting CPNS can be received through short-range wireless communication such as WiFi or the like and transmitted on an FM frequency, it is possible to conveniently listen to contents of various terminals supporting CPNS while staying in a vehicle, and thus users can be provided with an environment convenient to play back the contents.

BEST MODE FOR CARRYING OUT THE INVENTION

Details of the objects, technical configurations, and operational effects of the present invention described above will be further clearly understood hereinafter according to the detailed descriptions with reference to the drawings accompanied in the specification of the present invention.

The CPNS environment disclosed in the present invention is an environment in which a portable terminal capable of performing only short-range wireless communication but incapable of performing cellular communication with a mobile communication network is allowed to use data services that can be provided through cellular communication by performing short-range wireless communication with a mobile communication terminal that functions as a personal network service (PN) gateway.

As an embodiment of the present invention, a contents output system connecting an external speaker as a contents output device in a CPNS environment will be described.

Figure 1:
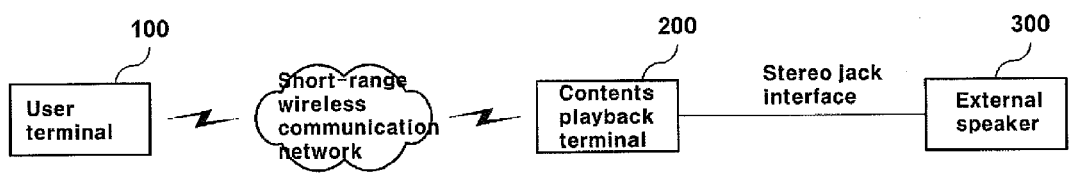
FIG. 1 a view showing a system for outputting contents through an external speaker in a CPNS environment according to an embodiment of the present invention.

FIG. 1 a view showing a contents output system connecting an external speaker as a contents output device in a CPNS environment according to an embodiment of the present invention.

Referring to FIG. 1, the contents output system in a CPNS environment includes a user terminal 100, a contents playback terminal 200 connected to the user terminal 100 through a short-range wireless communication network, and an external speaker 300 connected to the contents playback terminal 200 through a stereo jack.

The user terminal 100 searches for a contents playback terminal 200 supporting CPNS and shares contents with the contents playback terminal 200 by receiving contents information from the searched contents playback terminal 200 and downloading at least one piece previously stored contents to the contents playback terminal 200.

In addition, the user terminal 100 requests the contents playback terminal 200 to play back contents selected by a user.

In addition, although only one user terminal 100 is shown in the figure, there may be a plurality of user terminals supporting CPNS.

The user terminal 100 performing the functions described above is a PC, a mobile communication terminal, or the like, and the user terminal 100 will be described in detail with reference to FIG. 2.

The contents playback terminal 200 is connected to the user terminal 100 through the short-range wireless communication network, shares contents with the user terminal 100, decodes corresponding contents in response to a contents playback request received from the user terminal 100, and outputs the decoded contents through the external speaker 300 connected through the stereo jack.

Since the contents playback terminal 200 has a stereo jack, it can be easily connected to the external speaker 300 by connecting the stereo jack to an input port of the external speaker 300.

The contents playback terminal 200 is a portable terminal provided with a short-range wireless communication function, such as a PMP, an MP3 player, a vehicle navigation terminal, a cellular phone, a game console, or the like.

The external speaker 300 is a speaker installed in a vehicle, a speaker installed in a Dolby system, or the like.

The contents playback terminal 200 will be described in detail with reference to FIG. 3.

The user terminal 100 and a plurality of contents playback terminals 200 are associated with each other as one group and transmit and receive information to and from each other through the short-range wireless communication network, and they can even communicate with a mobile communication network. Here, the short-range wireless communication network includes all kinds of communication networks capable of performing short-range wireless communication, such as WiFi, Wibro, wireless LAN, Bluetooth, UWB, and the like.

Although it is not shown in the figure, the contents output system in a CPNS environment may further include a remote control device (not shown) for downloading shared contents or remotely selecting contents desired to be played back. The remote control device is a mobile communication terminal, a remote controller, or the like.

For example, if the remote control device is a mobile communication terminal, the mobile communication terminal can be connected to the user terminal 100 or the contents playback terminal 200 through the mobile communication network or the short-range wireless communication network and input a contents download command, a contents playback command, or the like.

Figure 2:
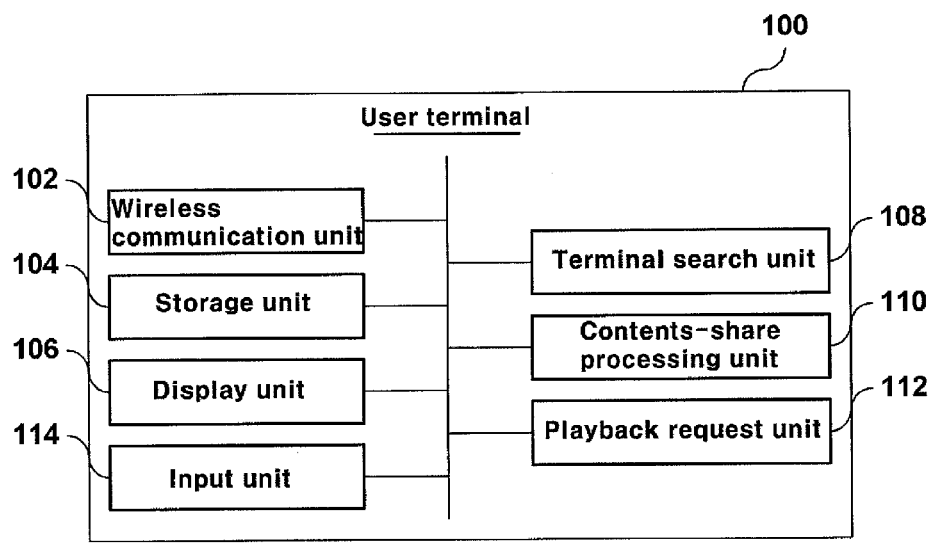
FIG. 2 is a block diagram schematically showing the configuration of a user terminal according to an embodiment of the present invention.

FIG. 2 is a block diagram schematically showing the configuration of a user terminal according to an embodiment of the present invention.

Referring to FIG. 2, the user terminal 100 includes a wireless communication unit 102 for performing communication through a short-range wireless communication network, a storage unit 104 for storing contents, a display unit 106, an input unit 114, a terminal search unit 108, a contents-share processing unit 110, and a playback request unit 112.

The wireless communication unit 102 is provided with a short-range wireless communication module, such as a module for WiFi, Wibro, wireless LAN, Bluetooth, UWB, or the like.

The input unit 114 receives a contents download command, a contents playback command, or the like from the user.

The display unit 106 displays a list of contents stored in the storage unit 104 and a list of contents processed to be shared by the contents-share processing unit 110. The user may confirm the contents lists displayed on the display unit 106 and select desired contents to request playback of the contents.

The terminal search unit 108 searches for a contents playback terminal supporting CPNS, receives terminal information from the searched contents playback terminal, and manages the terminal information. Here, the terminal information includes identification (ID) of the contents playback terminal, services provided, and the like.

That is, the terminal search unit 108 searches for a contents playback terminal that will function as a PN gateway device in order to use CPNS services.

The contents-share processing unit 110 allows contents to be shared with the user terminal by requesting and receiving contents information from the contents playback terminal searched by the terminal search unit 108 and downloading at least one piece contents stored in the storage unit 104 to the searched contents playback terminal. Accordingly, the user terminal possesses contents the same as those of the contents playback terminal by the contents-share processing unit 110.

The playback request unit 112 transmits a request for playing back the contents selected by the user among the contents shared by the contents-share processing unit 110 to the contents playback terminal through the wireless communication unit 102.

That is, the playback request unit 112 transmits a playback request message for requesting playback of the contents selected by the user through the remote control device or the user terminal to the contents playback terminal through the wireless communication unit 102.

At this point, the user may request playback of the contents downloaded into the contents playback terminal by the contents-share processing unit 110 or request playback of the contents selected by the user among the contents stored in the storage unit 104 while streaming the contents.

In addition, the user may request playback of the contents stored in the contents playback terminal.

Figure 3:
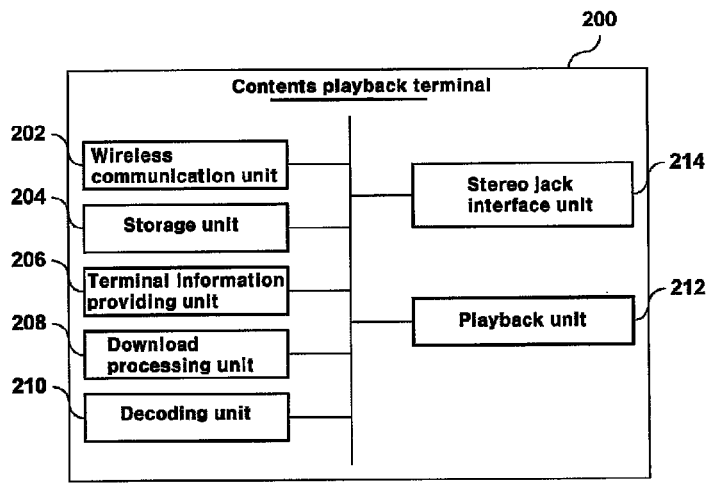
FIG. 3 is a block diagram schematically showing the configuration of a contents playback terminal according to an embodiment of the present invention.

FIG. 3 is a block diagram schematically showing the configuration of a contents playback terminal according to an embodiment of the present invention.

Referring to FIG. 3, the contents playback terminal 200 includes a wireless communication unit 202 for performing communication through a short-range wireless communication network, a storage unit 204 for storing contents, a download processing unit 208, a decoding unit 210, a playback unit 212, and a stereo jack interface unit 214.

The download processing unit 208 allows contents to be shared with the user terminal by downloading contents from the user terminal through the wireless communication unit 202 and transmitting contents stored in the storage unit 204 to the user terminal.

That is, the download processing unit 208 allows contents to be shared with the user terminal by storing the contents downloaded from the user terminal into the storage unit 204 or providing the user terminal with the contents stored in the storage unit 204. Accordingly, the contents playback terminal possesses contents the same as those of the user terminal by the down processing unit 208.

The decoding unit 210 decodes the contents requested to be played back by the user terminal. That is, the decoding unit 210 decodes the contents downloaded or streamed from the user terminal and allows the decoded contents to be outputted through the external speaker connected through the stereo jack interface unit 214.

The stereo jack interface unit 214 provides an interface with the external speaker so that the decoded contents can be outputted through the external speaker.

That is, the stereo jack interface unit 214 is connected to an input port of the external speaker through a stereo jack, transfers the contents decoded by the decoding unit 210 to the external speaker through the stereo jack, and allows the contents to be outputted through the external speaker.

If the contents playback terminal is not connected to the external speaker through the stereo jack interface unit 214, the playback unit 212 plays back and outputs the contents decoded by the decoding unit 210.

The contents playback terminal 200 may further include a terminal information providing unit 205 for providing the user terminal with terminal information through the wireless communication unit 202.

Figure 4:
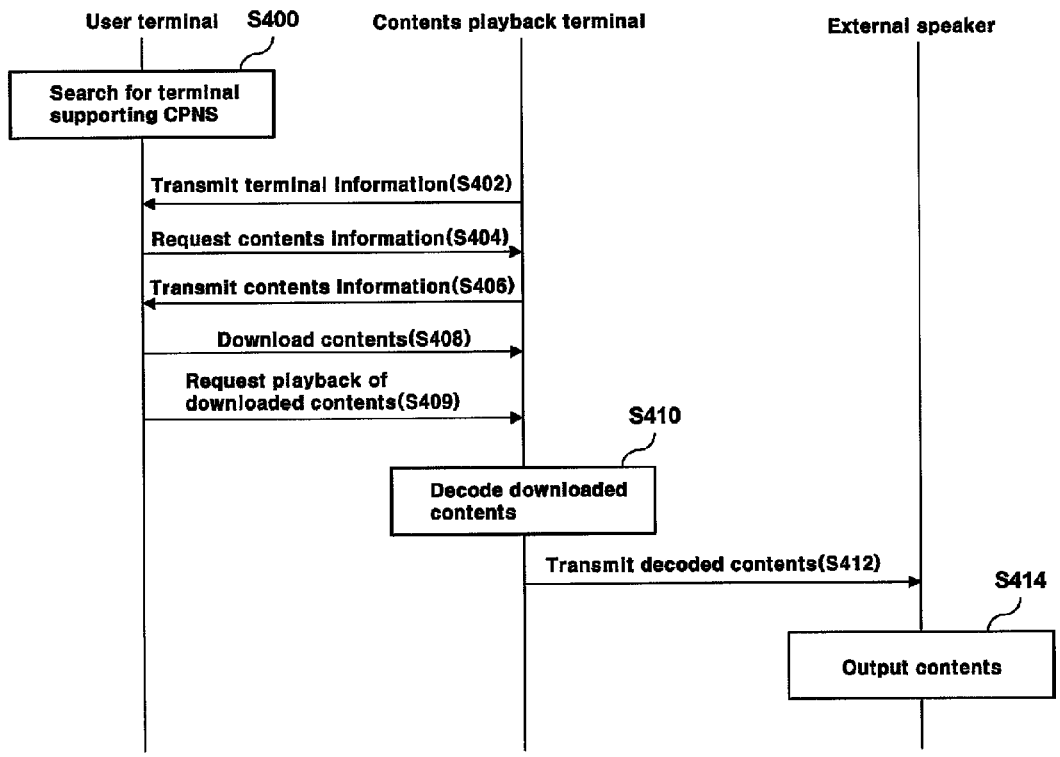
FIGS. 4 and 5 are sequence diagrams showing a method for outputting contents through an external speaker in a CPNS environment according to an embodiment of the present invention.

FIG. 4 is sequence diagrams showing a method for outputting contents through an external speaker in a CPNS environment according to an embodiment of the present invention.

Referring to FIG. 4, the user terminal searches for a contents playback terminal supporting CPNS S400 and receives terminal information from the searched contents playback terminal S402. At this point, the user terminal and the contents playback terminal perform an initial setup procedure for CPNS services.

That is, the contents playback terminal searches for a user terminal that will function as a PN gateway device in order to use the CPNS services. Next, the user terminal examines whether or not the contents playback terminal is capable of performing the CPNS services based on the terminal information received from the contents playback terminal. If the contents playback terminal is capable of performing the CPNS services as a result of the examination, the user terminal transmits an authentication message informing that the CPNS services can be performed to the contents playback terminal. If the contents playback terminal receives the authentication message informing that the CPNS services can be performed from the user terminal, the contents playback terminal transmits its own ID.

The user terminal examines whether or not the format of the ID transmitted from the contents playback terminal matches the ID format issued by the CPNS, and if the ID formats match, an authentication message informing that the services can be performed is transmitted to the contents playback terminal.

If the initial setup procedure for CPNS services between the user terminal and the contents playback terminal is performed, the user terminal requests contents information from the contents playback terminal selected by the user S404, and the contents playback terminal transmits information on previously stored contents to the user terminal in response to the contents information request S406. The contents information transmitted to the user terminal may include both a contents list and details of corresponding contents.

After performing step S406, the user terminal downloads the contents selected by the user to the contents playback terminal S408. That is, the user selects contents desired to be played back among the contents stored in the user terminal and downloads the selected contents to the contents playback terminal.

At this point, the user terminal may download all the previously stored contents, as well as the contents desired to be played back, to the contents playback terminal.

After performing step S408, the user terminal transmits a contents playback request signal for requesting playback of the downloaded contents to the contents playback terminal S409. The contents playback request signal includes information on the downloaded contents and the like.

After performing step S409, the contents playback terminal decodes corresponding contents in response to the contents playback request S410 and transmits the decoded contents to the external speaker connected through a stereo jack S412.

The external speaker amplifies and outputs the contents transmitted from the contents playback terminal S414.

If the contents playback device can be connected to a network, it is possible to download and play back in real-time a sound source existing in a large-capacity HDD of the user terminal or sound source data in a server that provides MP3 files, and thus limit in capacity of existing contents playback terminals can be overcome, thereby providing convenience.

In addition, if the contents playback device is connected to an input port of an existing external speaker, the speaker can be used in the form of an Internet speaker, and thus a user can listen to the contents on the network in a further abundant sound environment.

Figure 5:
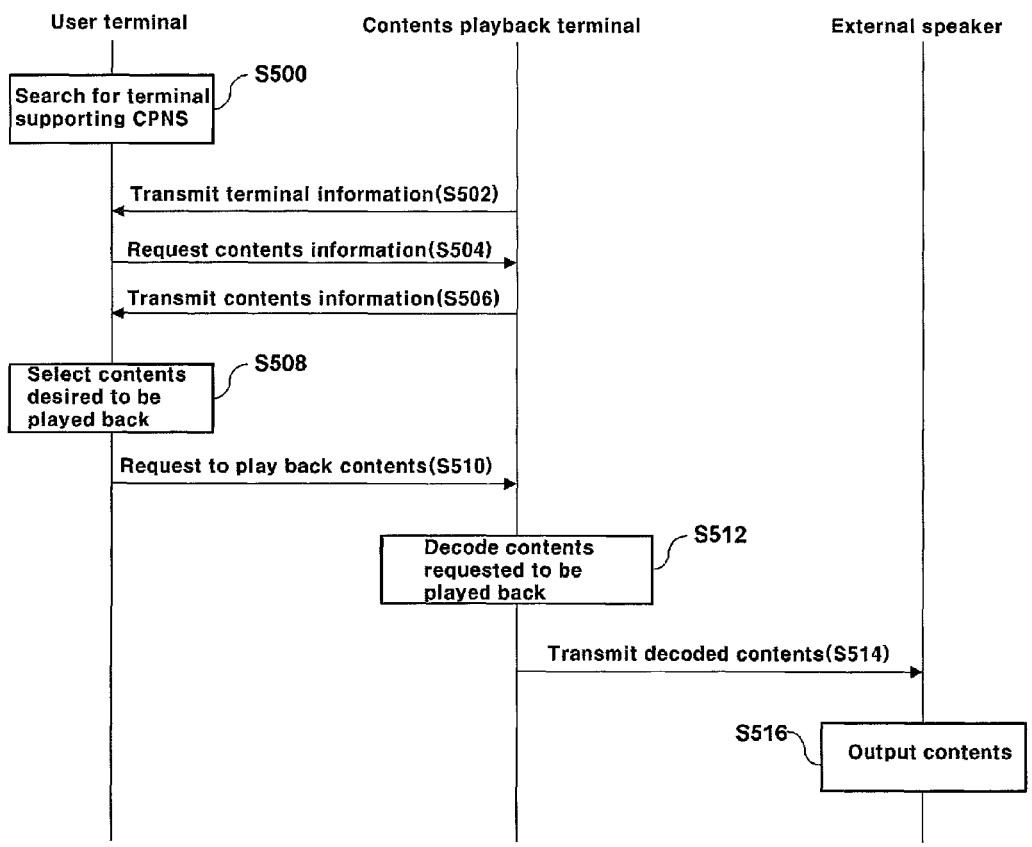

FIG. 5 is sequence diagrams showing a method for outputting contents through an external speaker in a CPNS environment according to an embodiment of the present invention.

Referring to FIG. 5, the user terminal searches for a contents playback terminal supporting CPNS S500 and receives terminal information from the searched contents playback terminal S502. At this point, the user terminal and the contents playback terminal perform an initial setup procedure for CPNS services.

Next, the user terminal requests contents information from the contents playback terminal selected by the user S504, and the contents playback terminal transmits information on previously stored contents to the user terminal in response to the contents information request S506. The contents information transmitted to the user terminal may include both a contents list and all the details of corresponding contents.

The user confirms the contents information received from the contents playback terminal and a list of previously stored contents and selects contents desired to be played back.

After performing step S506, if the user selects contents desired to be played back S508, the user terminal requests the contents playback terminal to play back the selected contents S510.

At this point, the user terminal transmits a contents playback request signal requesting playback of the contents to the contents playback terminal. Here, the contents playback request signal includes a list of contents requested to be played back.

The user may select contents desired to be played back among the contents received from the contents playback terminal and the previously stored contents. At this point, the selected contents may be at least any one piece contents stored only in the user terminal, contents stored only in the contents playback terminal, and contents stored in both the user terminal and the contents playback terminal.

For example, if the selected contents are stored only in the user terminal, the user terminal downloads or streams the selected contents to the contents playback terminal and requests the contents playback terminal to play back the contents.

After performing step S510, the contents playback terminal determines whether or not the contents playback terminal possesses the contents requested to be played back by the user terminal S512.

If the contents playback terminal possesses the contents requested to be played back as a result of the determination, the contents playback terminal extracts and decodes corresponding contents, whereas the contents playback terminal does not possess the contents requested to be played back, the contents playback terminal downloads the contents from the user terminal and decodes the downloaded contents S513.

After performing step S513, the contents playback terminal transmits the decoded contents to the external speaker connected through the stereo jack S514, and the external speaker amplifies and outputs the contents transmitted from the contents playback terminal S516.

Hereinafter, a contents playback system in a CPNS environment according to an embodiment of the present invention will be described.

Figure 6:
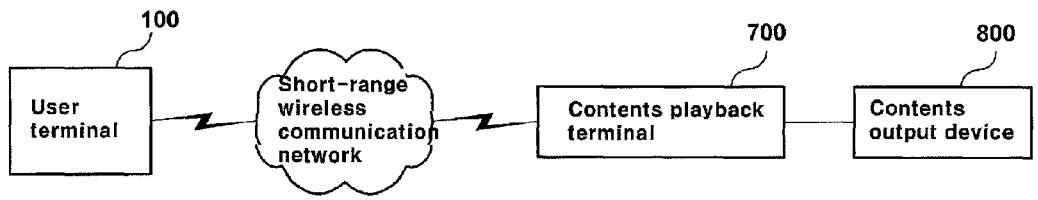
FIG. 6 is a view showing a contents playback system in a CPNS environment according to an embodiment of the present invention.

FIG. 6 is a view showing a contents playback system in a CPNS environment according to an embodiment of the present invention.

Referring to FIG. 6, the contents playback system in a CPNS environment includes a user terminal 100, and a contents playback terminal 700 connected to the user terminal 100 through a short-range wireless communication network.

In addition, the contents playback system in a CPNS environment may further include a contents output device 800 connected to the contents playback terminal 700.

The user terminal 100 searches for a contents playback terminal 700 supporting CPNS and shares contents with the contents playback terminal 700 by receiving contents information from the searched contents playback terminal 700 and downloading at least one piece previously stored contents to the contents playback terminal 700.

In addition, the user terminal 100 requests the contents playback terminal 700 to play back the contents selected by the user. At this point, the user terminal 100 may transmit a list of contents selected by the user to the contents playback terminal 700 and request to play back corresponding contents, or request to play back the contents selected by the user while streaming the contents.

Although only one user terminal 100 is shown in the figure, there may be a plurality of user terminals supporting CPNS.

The user terminal 100 performing the functions described above is a PC, a mobile communication terminal, or the like loaded with the CPNS protocol.

The contents playback terminal 700 is connected to the user terminal 100 through a short-range wireless communication network, shares contents with the user terminal 100, decodes corresponding contents in response to a contents playback request received from the user terminal 100 or a provided input unit, and outputs the decoded contents through an external speaker 800 connected through the stereo jack or a provided speaker. At this point, the contents playback terminal 700 determines whether or not the contents playback terminal possesses the contents requested to be played back by the user. If the contents playback terminal possesses the contents requested to be played back, the contents playback terminal extracts and decodes corresponding contents, whereas if the contents playback terminal does not possess the contents, the contents playback terminal downloads the contents from the user terminal 100 and decodes the downloaded contents.

In addition, the contents playback terminal 700 shares contents with the user terminal 100 by downloading the contents from at least one of user terminals 100 existing in the same network according to the CPNS communication protocols and transmitting previously stored contents to the user terminal 100.

In addition, since the contents playback terminal 700 has a stereo jack, it can be easily connected to the external speaker by connecting the stereo jack to an input port of the external speaker. Here, the external speaker is a speaker installed in a vehicle, a speaker installed in a Dolby system, or the like.

The contents playback terminal 700 is a portable terminal provided with a short-range wireless communication function, such as a PMP, a MP3 player, a vehicle navigation terminal, a cellular phone, a game console, or the like.

The contents playback terminal 700 will be described in detail with reference to FIG. 7. The user terminal 100 and the contents playback terminal 700 are associated with each other as one group and transmit and receive information to and from each other through the short-range wireless communication network, and they can even communicate with a mobile communication network. Here, the short-range wireless communication network includes all kinds of communication networks capable of performing short-range wireless communication, such as WiFi, Wibro, wireless LAN, Bluetooth, UWB, and the like.

For example, if the short-range wireless communication network is WiFi, the user terminal 100 and the contents playback terminal 700 are connected in an infrastructure mode in which a wireless LAN can be connected through a wireless router or a public AP, or in an ad-hoc mode in which a wireless LAN can be connected among PCs installing a wireless adapter without using a router or a public AP.

Although it is not shown in the figure, the contents playback system in a CPNS environment may further include a remote control device (not shown) for downloading shared contents or remotely selecting contents desired to be played back. The remote control device is a mobile communication terminal, a remote controller, or the like.

For example, if the remote control device is a mobile communication terminal, the mobile communication terminal can be connected to the user terminal 100 or the contents playback terminal 700 through the mobile communication network or the short-range wireless communication network and input a contents download command, a contents playback command, or the like.

Figure 7:
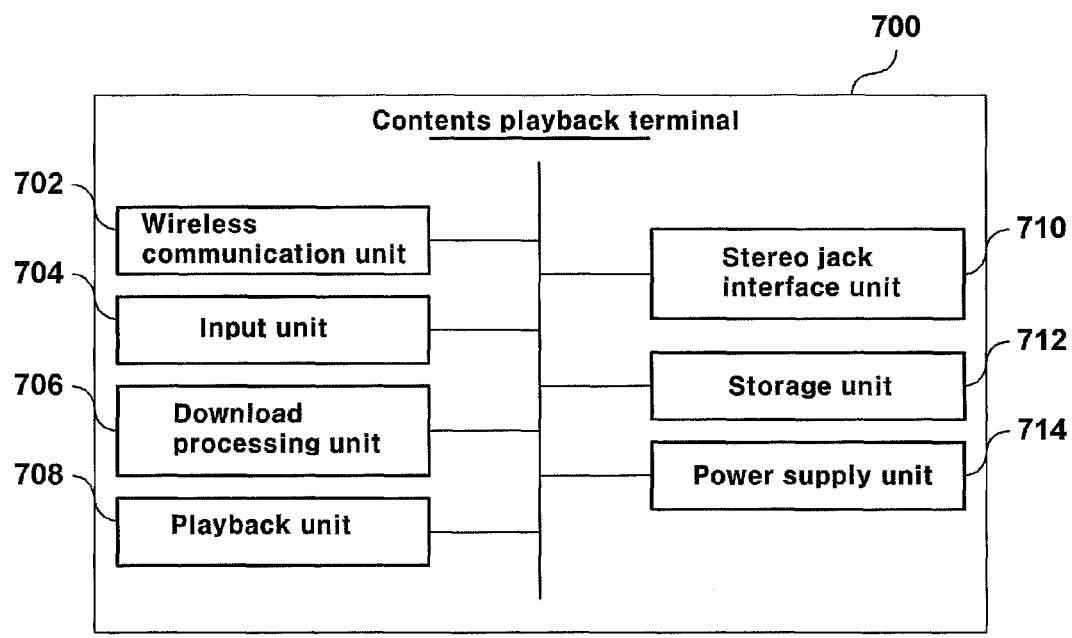
FIG. 7 is a block diagram schematically showing the configuration of a contents playback terminal loaded with the CPNS protocol according to an embodiment of the present invention.

FIG. 7 is a block diagram schematically showing the configuration of a contents playback terminal in a CPNS environment according to an embodiment of the present invention.

Referring to FIG. 7, the contents playback terminal 700 loaded with the CPNS protocol includes a wireless communication unit 702 for performing communication through a short-range wireless communication network, an input unit 704 for inputting a user command, a download processing unit 706, a playback unit 708, a stereo jack interface unit 710, a storage unit 712 for storing contents, and a power supply unit 714 for supplying power.

The wireless communication unit 702 may be in an infrastructure mode in which a wireless LAN can be connected through a wireless router or a public AP, or in an ad-hoc mode in which a wireless LAN can be connected among PCs installing a wireless adapter without using a router or a public AP.

The input unit 704 is provided with a play button, a previous button, a next button, a volume up button, a volume down button, and the like for playing back contents stored in the storage unit 712. Accordingly, the user may select contents desired to be played back, request to play back the contents, control the volume, and perform other operations using the buttons provided in the input unit 704.

The download processing unit 706 downloads contents from at least one of user terminals 100 existing in the same network according to the CPNS communication protocols and transmits contents stored in the storage unit 712 to the user terminal so that the contents can be shared with the user terminal. That is, the download processing unit 706 may wirelessly download the contents stored in the user terminal, such as a smart phone, a PC, or the like, and store the downloaded contents into the storage unit 712.

If playback of contents is requested through the input unit 704, the playback unit 708 extracts corresponding contents from the storage unit 712 and plays back the extracted contents. That is, the playback unit 708 extracts the contents requested to be played back from the storage unit 712, decodes the extracted contents, and outputs the decoded contents through a provided speaker (not shown) or an external speaker.

In addition, the playback unit 708 determines whether or not the contents playback terminal 700 possesses the contents requested to be played back. If the contents playback terminal possesses the contents requested to be played back, the playback unit 708 extracts and decodes corresponding contents, whereas if the contents playback terminal does not possess the contents, the playback unit 708 downloads the contents from the user terminal and decodes the downloaded contents.

In addition, if output of the decoded contents through the external speaker is requested, the playback unit 708 outputs corresponding contents through the external speaker connected through the stereo jack interface unit 710.

The stereo jack interface unit 710 provides an interface with the external speaker so that the contents played back by the playback unit 708 can be outputted through the external speaker. That is, the stereo jack interface unit 710 is connected to an input port of the external speaker through a stereo jack, transfers the contents decoded by the playback unit 708 to the external speaker through the stereo jack, and allows the contents to be outputted through the external speaker. Here, the stereo jack may be, for example, a 3.5 stereo jack.

The storage unit 712 stores the contents downloaded from the user terminal through the wireless communication unit 702.

The contents playback terminal 700 may further includes a dongle information providing unit (not shown) for providing the user terminal with dongle information through the wireless communication unit 702.

In addition, the contents playback terminal 700 may further includes a display unit (not shown) for displaying a list of contents, details of contents, and the like.

In addition, although it is described that the contents playback terminal 700 is connected to the external speaker through the stereo jack, the contents playback terminal 700 can be connected to the external speaker through USB.

Figure 8:
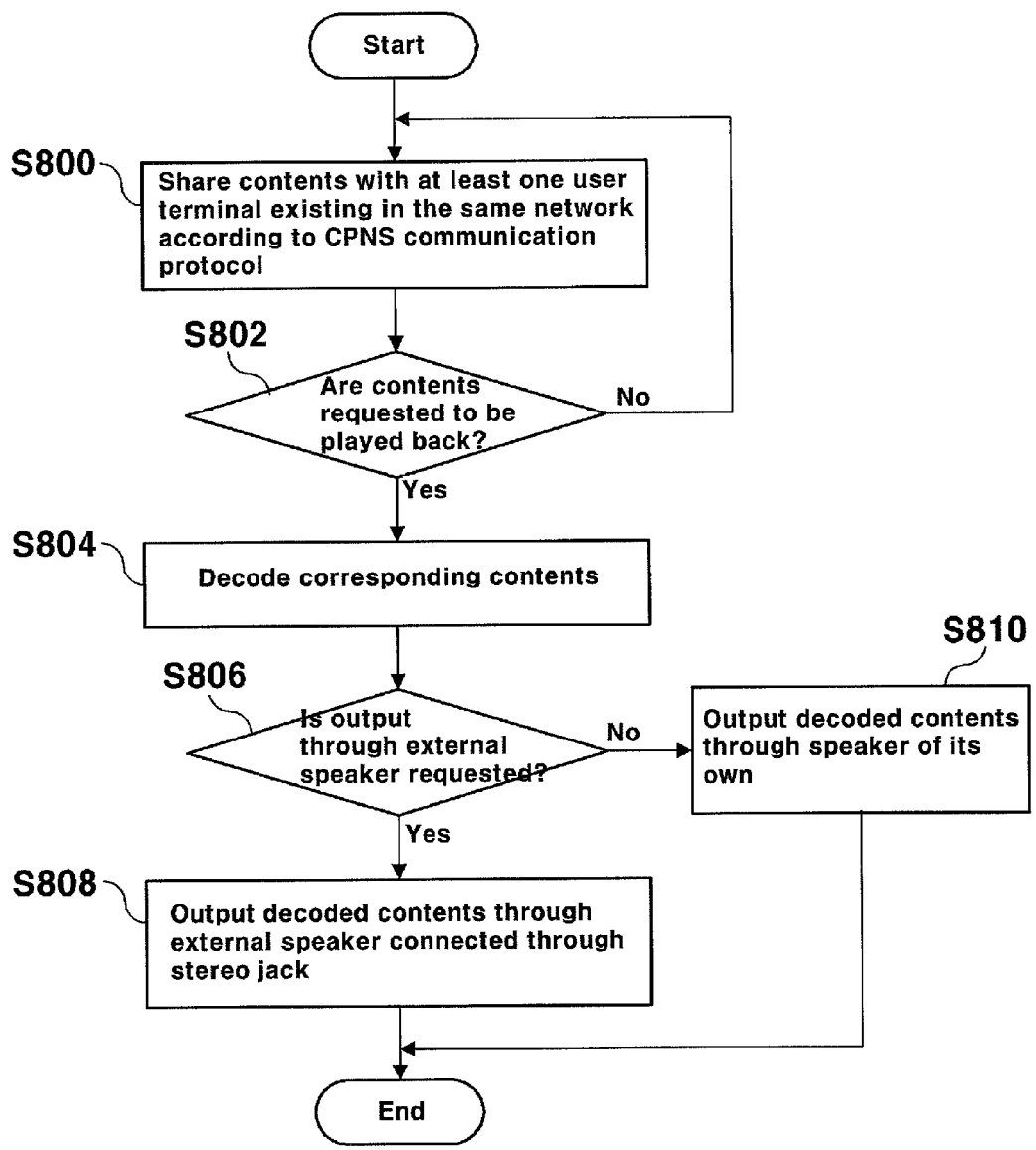
FIGS. 8 and 9 are flowcharts illustrating a method for playing back contents by a contents playback terminal according to an embodiment of the present invention.

FIG. 8 is a flowchart illustrating a method for playing back contents by the contents playback terminal shown in FIG. 7.

Referring to FIG. 8, the contents playback terminal shares contents with the user terminal by transmitting contents information to the user terminal supporting CPNS in the CPNS environment and downloading contents from the user terminal S800. At this point, the user terminal and the contents playback terminal perform an initial setup procedure for CPNS services.

That is, the contents playback terminal searches for a user terminal that will function as a PN gateway device in order to use the CPNS services. Next, the user terminal examines whether or not the contents playback terminal is capable of performing the CPNS services based on the dongle information received from the contents playback terminal. If the contents playback terminal is capable of performing the CPNS services as a result of the examination, the user terminal transmits an authentication message informing that the CPNS services can be performed to the contents playback terminal. If the contents playback terminal receives the authentication message informing that the CPNS services can be performed from the user terminal, the contents playback terminal transmits its own ID.

The user terminal examines whether or not the format of the ID transmitted from the contents playback terminal matches the ID format issued by the CPNS, and if the ID formats match, an authentication message informing that the services can be performed is transmitted to the contents playback terminal.

If the initial setup procedure for the CPNS services between the user terminal and the contents playback terminal is performed, the contents playback terminal requests and receives contents information from the user terminal selected by the user. The contents information transmitted to the contents playback terminal may include both a contents list and details of corresponding contents.

After performing step S800, the contents playback terminal determines whether or not at least one piece the shared contents is requested to be played back S802.

That is, the user selects contents desired to be played back using an input unit provided in the contents playback terminal or a remote control device. At this point, the selected contents are shared between the user terminal and the contents playback terminal, and the contents stored in the user terminal and the contents playback terminal can be the same.

If at least one piece the shared contents is requested to be played back as a result of the determination in step S802, the contents playback terminal extracts and decodes corresponding contents S804. The contents requested to be played back may be the contents downloaded from the user terminal or the contents stored in its own storage unit.

After performing step S804, the contents playback terminal determines whether or not output of the decoded contents through an external speaker is requested S806.

If output of the decoded contents through an external speaker is requested as a result of the determination in step S806, the contents playback terminal outputs corresponding contents through the external speaker connected through the stereo jack S808.

If output of the decoded contents through an external speaker is not requested as a result of the determination in step S806, the contents playback terminal outputs corresponding contents through a speaker of its own S810. At this point, the user may control the volume and the like through the provided input unit.

Figure 9:
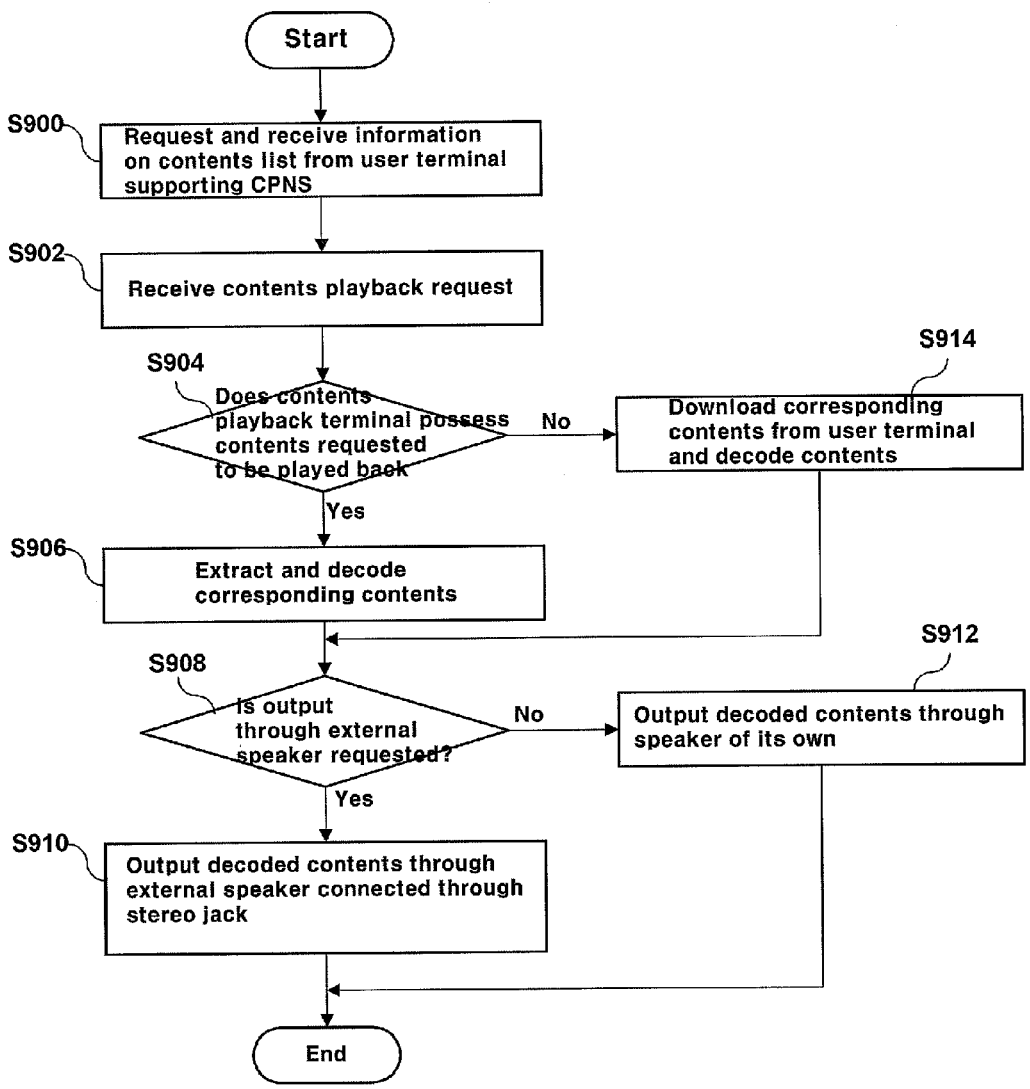

FIG. 9 is a flowchart illustrating a method for playing back contents by the contents playback terminal shown in FIG. 7.

Referring to FIG. 9, the contents playback terminal searches for a user terminal supporting CPNS and requests and receives contents list information from the searched user terminal S900.

Next, if playback of contents is requested through a provided input unit S902, the contents playback terminal determines whether or not the contents playback terminal possesses the contents requested to be played back S904. That is, since the user may request playback of contents by selecting one piece the contents in the contents list received from the user terminal or by selecting one piece the contents stored in its own storage unit, the contents playback terminal determines whether or not the contents playback terminal possesses the contents requested to be played back.

If the contents playback terminal possesses the contents requested to be played back as a result of the determination in step S904, the contents playback terminal extracts and decodes corresponding contents S906 and determines whether or not output of the decoded contents through an external speaker is requested S908.

If output of the decoded contents through an external speaker is requested as a result of the determination in step S908, the contents playback terminal outputs the decoded contents through the external speaker connected through a stereo jack S910.

If output of the decoded contents through an external speaker is not requested as a result of the determination in step S908, the contents playback terminal outputs the decoded contents through a speaker of its own S912.

If the contents playback terminal does not possess the contents requested to be played back as a result of the determination in step S904, the contents playback terminal downloads corresponding contents from the user terminal and decodes the downloaded contents S914. Next, the contents playback terminal performs step S908.

The contents playback terminal loaded with the CPNS protocol according to another embodiment of the present invention includes a wireless communication unit for performing communication through a short-range wireless communication network, a contents processing unit, a decoding unit, a stereo jack interface unit, and a power supply unit for supplying power.

The wireless communication unit may be in an infrastructure mode in which a wireless LAN can be connected through a wireless router or a public AP, or in an ad-hoc mode in which a wireless LAN can be connected among PCs installing a wireless adapter without using a router or a public AP.

The contents processing unit streams the contents requested to be played back by the user terminal through the wireless communication unit in response to a contents playback request received from a user terminal existing in the same network.

The decoding unit decodes the streamed contents and allows the decoded contents to be outputted through an external speaker connected through the stereo jack interface unit.

The stereo jack interface unit provides an interface with the external speaker so that the decoded contents can be outputted through the external speaker.

The contents playback terminal may further include an input unit (not shown) provided with buttons for controlling volume of the contents outputted through the external speaker. That is, the input unit is provided with a volume up button, a volume down button, and the like.

Since the contents playback terminal configured as described above is not provided with a storage unit, it only performs an operation of streaming the contents from the user terminal and outputting the contents through the external speaker.

Figure 10:
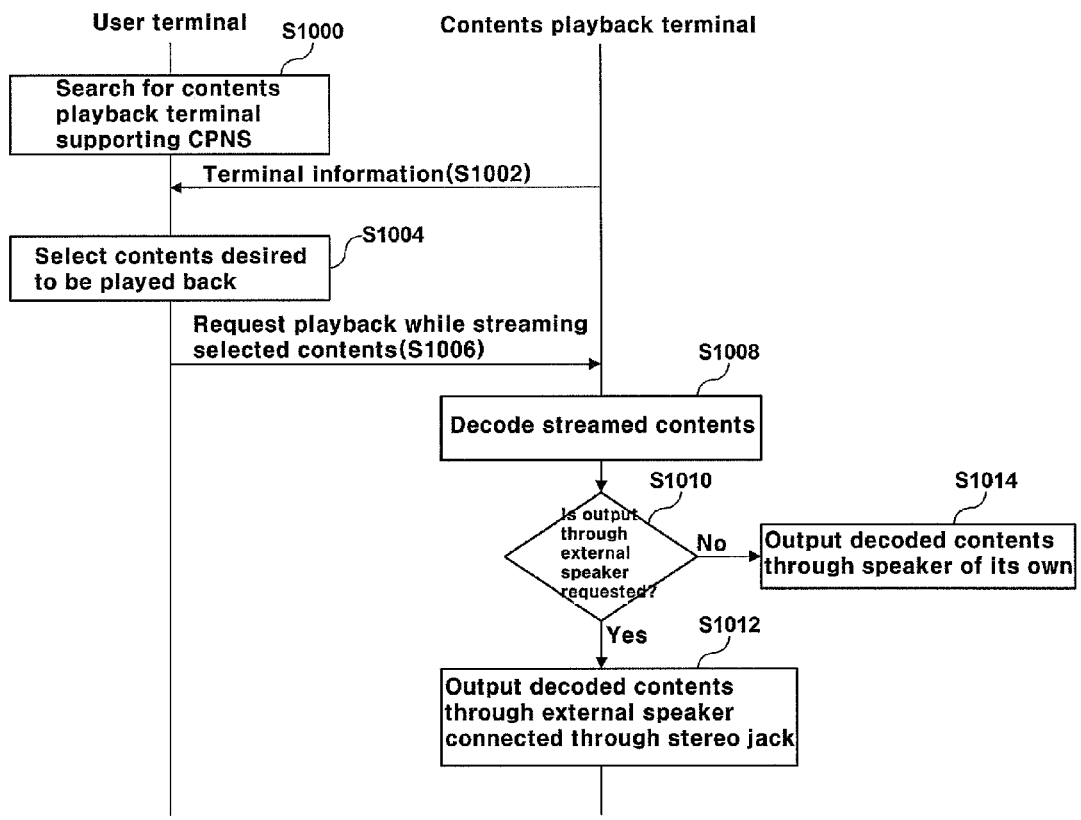
FIG. 10 is a sequence diagram showing a method for playing back contents by a contents playback terminal according to an embodiment of the present invention.

FIG. 10 is a sequence diagram showing a method for playing back contents by a contents playback terminal according to an embodiment of the present invention.

Referring to FIG. 10, the user terminal searches for a contents playback terminal supporting CPNS S1000 and receives dongle information from the searched contents playback terminal S1002. At this point, the user terminal and the contents playback terminal perform an initial setup procedure for CPNS services.

After performing step S1002, if a user selects contents desired to be played back S1004, the user terminal requests playback of the selected contents while streaming the contents to the contents playback terminal S1006.

The contents playback terminal decodes the streamed contents S1008 and determines whether or not output of the contents through the external speaker is requested S1010.

If output of the contents through the external speaker is requested as a result of the determination in step S1010, the contents playback terminal outputs the decoded contents through the external speaker connected through the stereo jack S1012.

If output of the decoded contents through an external speaker is not requested as a result of the determination in step S1010, the contents playback terminal outputs the decoded contents through a speaker of its own S1014.

If the contents playback terminal can be connected to a network, it is possible to download and play back in real-time a sound source existing in a large-capacity HDD of the user terminal or sound source data in a server that provides MP3 files, and thus limit in capacity of existing contents playback terminals can be overcome, thereby providing convenience.

In addition, if the contents playback terminal is connected to an input port of an existing external speaker, the speaker can be used in the form of an Internet speaker, and thus a user can be provided with a value of listening to contents on the network in a further abundant sound environment.

Figure 11:
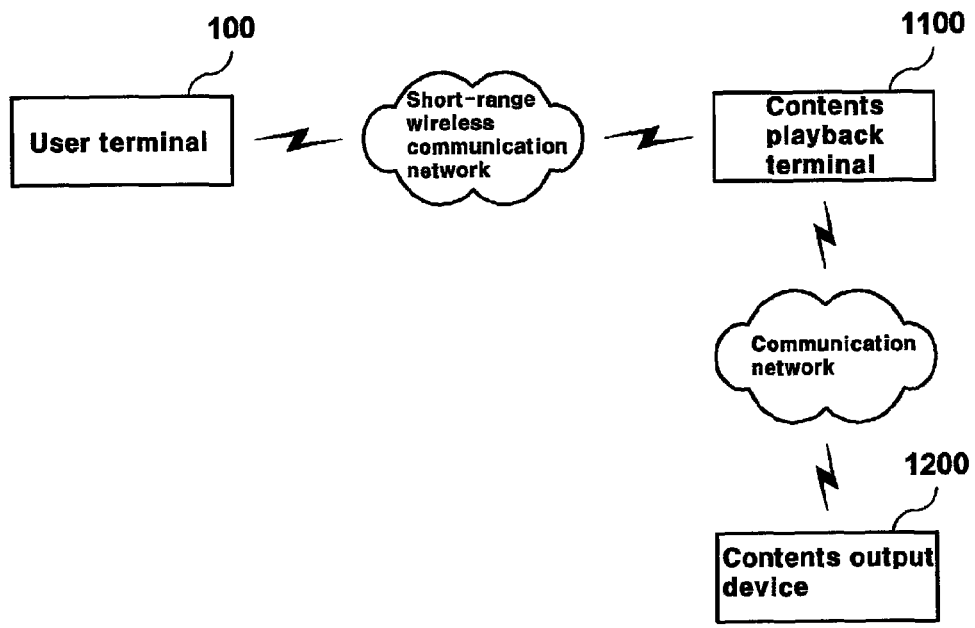
FIG. 11 is a view showing a system for playing back contents through FM transmission in a CPNS environment according to an embodiment of the present invention.

FIG. 11 is a view showing a system for playing back contents through FM transmission in a CPNS environment according to an embodiment of the present invention.

Referring to FIG. 11, the system for playing back contents through FM transmission in a CPNS environment includes a user terminal 100, a contents playback terminal 1100 connected to the user terminal 100 through a short-range wireless communication network, and a contents output device 1200.

The user terminal 100 searches for a contents playback terminal 1100 supporting CPNS and shares contents with the contents playback terminal 1100 by receiving contents information from the searched contents playback terminal 1100 and downloading at least one piece previously stored contents to the contents playback terminal 1100.

In addition, the user terminal 100 requests the contents playback terminal 1100 to play back contents selected by the user.

The user terminal 100 performing the functions described above is a PC, an MP3 player, a PMP or the like, and the user terminal 100 has been described above in detail with reference to FIG. 2.

The contents playback terminal 1100 is connected to the user terminal 100 through a short-range wireless communication network, decodes corresponding contents in response to a contents playback request received from the user terminal 100, converts the decoded contents into FM data, and transmits the FM data. At this point, the contents playback terminal 1100 transmits the FM data at a specific frequency.

The contents playback terminal 1100 may be a dongle type that receives contents such as MP3 data from the user terminal 100 supporting CPNS through the short-range wireless communication network, decodes the contents in real-time, and transmits the decoded contents through an FM module.

The contents playback terminal 1100 will be described in detail with reference to FIG. 12.

The user terminal 100 and one or more contents playback terminals 1100 are associated with each other as one group and transmit and receive information to and from each other through the short-range wireless communication network, and although it is not shown in the figure, they can even communicate with a mobile communication network. Here, the short-range wireless communication network includes all kinds of communication networks capable of performing short-range wireless communication, such as WiFi, Wibro, wireless LAN, Bluetooth, UWB, and the like.

The contents output device 1200 is a device loaded with an FM receiver function, which demodulates and plays back FM data received from the contents playback terminal 1100.

The contents output device 1200 is a stereo system such as a radio in a vehicle.

Accordingly, the FM data transmitted from the contents playback terminal 1100 into a wireless section is received by a radio of an audio device provided in a vehicle through a vehicle antenna provided in the vehicle to receive FM radio and outputted through the stereo speaker of the radio. At this point, the user tunes radio frequency of the audio device provided in the vehicle in to the FM data signal generated by the contents playback terminal 1100.

The contents playback terminal 1100 is connected to the contents output device 1200 through a wireless network or the like for wirelessly transmitting and receiving the FM data.

Since the audio device provided in the vehicle is tuned in to a frequency transmitted from the contents playback terminal 1100 and contents are outputted through the speaker installed in the vehicle, the driver and passengers can listen to and enjoy contents of a further improved quality and listen to the contents through the speaker in the same manner as listening to and enjoying contents through a radio.

The contents output device 1200 will be described in detail with reference to FIG. 13.

Using the system for playing back contents through FM transmission configured as described above, the user may output contents stored in a cellular phone or an MP3 player carried by the user through a stereo system of a vehicle while driving the vehicle.

Although it is not shown in the figure, the system for playing back contents through FM transmission in a CPNS environment may further include a remote control device for downloading shared contents or remotely selecting contents desired to be played back. The remote control device is a mobile communication terminal, a remote controller, or the like.

For example, if the remote control device is a mobile communication terminal, the mobile communication terminal can be connected to the user terminal 100 or the contents playback terminal 1100 through a mobile communication network or a short-range wireless communication network and input a contents download command, a contents playback command, or the like.

The user terminal of the present embodiment is shown in FIG. 2 and the same as described in an embodiment in which an external speaker is connected to the contents output device of the contents output system in a CPNS environment.

Figure 12:
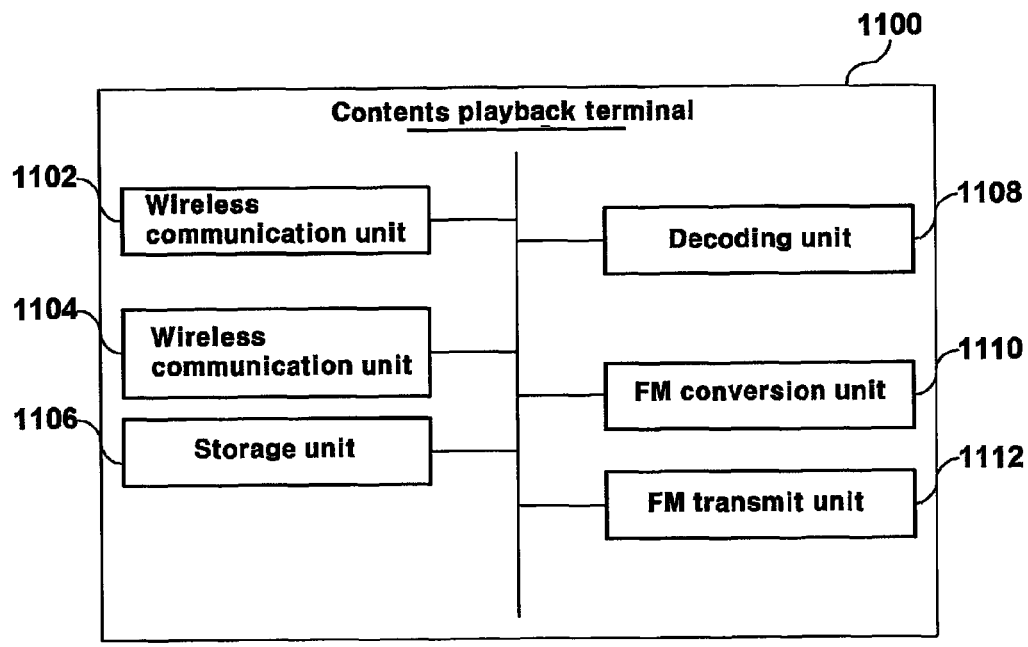
FIG. 12 is a block diagram schematically showing the configuration of a contents playback terminal according to an embodiment of the present invention.

FIG. 12 is a block diagram schematically showing the configuration of a contents playback terminal according to an embodiment of the present invention.

Referring to FIG. 12, the contents playback terminal 1100 includes a wireless communication unit 1102 for performing communication through a short-range wireless communication network, a download processing unit 1104, a storage unit 1106 for storing contents, a decoding unit 1108, an FM conversion unit 1110, and an FM transmit unit 1112.

The download processing unit 1104 allows contents to be shared with the user terminal by downloading contents from the user terminal through the wireless communication unit 1102 and transmitting contents stored in the storage unit 1106 to the user terminal.

That is, the download processing unit 1104 allows contents to be shared with the user terminal by storing the contents downloaded from the user terminal into the storage unit 1106 and providing the user terminal with the contents stored in the storage unit 1106.

The decoding unit 1108 decodes the contents requested to be played back by the user terminal. That is, the decoding unit 1108 decodes the contents downloaded or streamed from the user terminal.

The FM conversion unit 1110 converts the contents decoded by the decoding unit 1108 into FM data. At this point, the FM conversion unit 1110 converts the contents decoded by the decoding unit 1108 into the FM data by modulating and demodulating the contents and selectively converts the contents so that the converted FM data may have a frequency band that can be received by the radio.

The FM transmit unit 1112 converts the FM data into a high frequency signal in order to wirelessly transmit the FM data on a channel selected by the FM conversion unit 1110, amplifies the converted high frequency FM data to a predetermined level in order to wirelessly transmit the high frequency FM data, and transmits the amplified FM data.

The FM transmit unit 1112 transmits the amplified FM data through an antenna.

Figure 13:
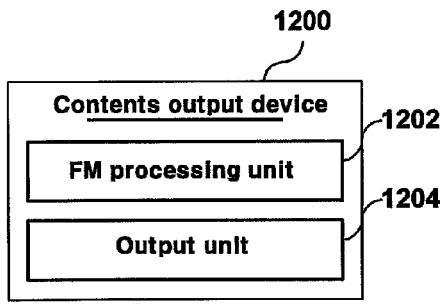
FIG. 13 is a block diagram schematically showing the configuration of a contents output device according to an embodiment of the present invention.

FIG. 13 is a block diagram schematically showing the configuration of a contents output device according to an embodiment of the present invention.

Referring to FIG. 13, the contents output device 1200 includes an FM processing unit 1202 and an output unit 1204.

The FM processing unit 1202 is tuned in to a frequency transmitted from the contents playback terminal and demodulates FM data received through the frequency. That is, the FM processing unit 1202 receives the FM data transmitted from the contents playback terminal through a provided antenna (not shown) and demodulates the received FM data.

The output unit outputs the contents demodulated by the FM processing unit 1202. The output unit, for example, is a speaker, a display device, or the like attached to an audio device of the vehicle.

Although it is not shown in the figure, the contents output device 1200 is provided with a communication unit (not shown) for receiving FM data from the contents playback terminal through wireless communication.

Figure 14:
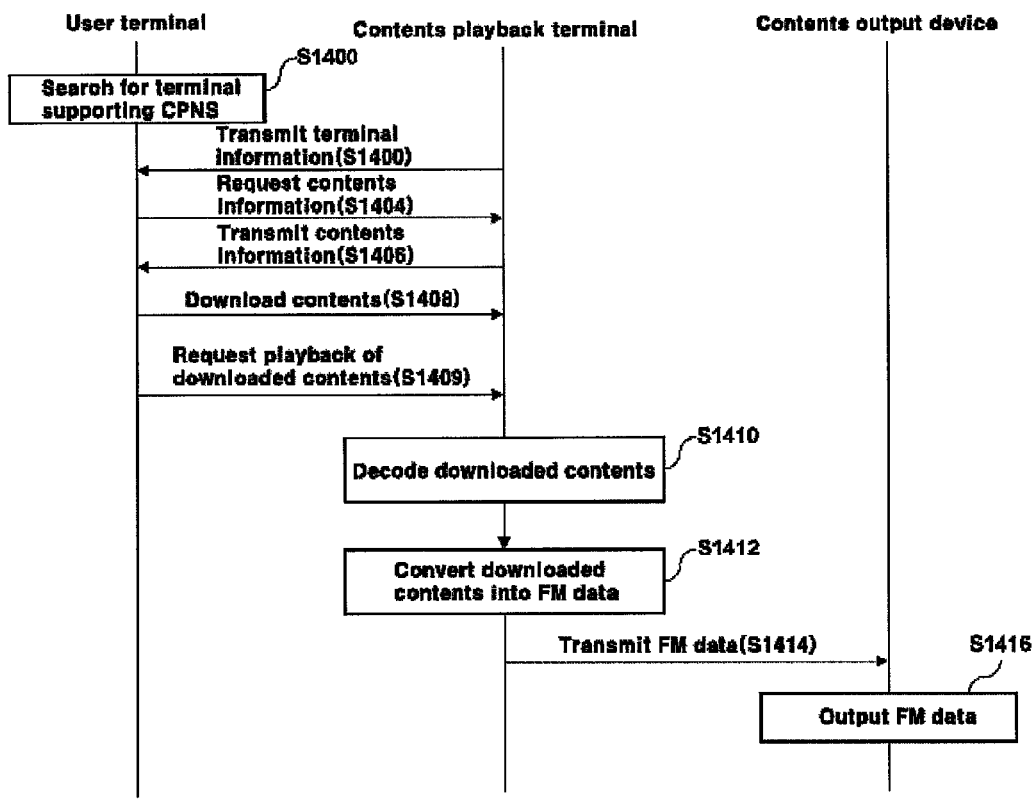
FIGS. 14 and 15 are sequence diagrams showing a method for playing back contents through FM transmission in a CPNS environment according to an embodiment of the present invention.

FIG. 14 is sequence diagrams showing a method for playing back contents through FM transmission in a CPNS environment according to an embodiment of the present invention.

Referring to FIG. 14, the user terminal searches for a contents playback terminal supporting CPNS S1400 and receives terminal information from the searched contents playback terminal S1402. At this point, the user terminal and the contents playback terminal perform an initial setup procedure for CPNS services.

That is, the user terminal searches for a contents playback terminal that will function as a PN gateway device in order to use the CPNS services. Next, the user terminal examines whether or not the contents playback terminal is capable of performing the CPNS services based on the terminal information received from the contents playback terminal. If the contents playback terminal is capable of performing the CPNS services as a result of the examination, the user terminal transmits an authentication message informing that the CPNS services can be performed to the contents playback terminal. If the contents playback terminal receives the authentication message informing that the CPNS services can be performed from the user terminal, the contents playback terminal transmits its own ID.

The user terminal examines whether or not the format of the ID transmitted from the contents playback terminal matches the ID format issued by the CPNS, and if the ID formats match, an authentication message informing that the services can be performed is transmitted to the contents playback terminal.

If the initial setup procedure for the CPNS services between the user terminal and the contents playback terminal is performed, the user terminal requests contents information from the contents playback terminal selected by the user S1404, and the contents playback terminal transmits information on previously stored contents to the user terminal in response to the contents information request S1406. The contents information transmitted to the user terminal may include both a contents list and details of corresponding contents.

After performing step S1406, the user terminal downloads the contents selected by the user to the contents playback terminal S1408. That is, the user selects contents desired to be played back among the contents stored in the user terminal and downloads the selected contents to the contents playback terminal.

Next, the user terminal transmits a contents playback request signal for requesting playback of the downloaded contents to the contents playback terminal S1409. The contents playback request signal includes information on the downloaded contents and the like.

After performing step S1409, the contents playback terminal decodes the downloaded contents in response to the contents playback request S1410 and converts the decoded contents into FM data S1412.

At this point, the contents playback terminal converts the decoded contents into FM data by modulating and demodulating the contents and selectively converts the contents so that the converted FM data may have a frequency band that can be received by the radio. Next, the contents playback terminal converts the FM data into a high frequency signal in order to wirelessly transmit the FM data on a selected channel and amplifies the converted high frequency FM signal to a predetermined level in order to wirelessly transmit the high frequency FM signal.

Next, the contents playback terminal transmits the amplified FM data to the contents playback device through a wireless antenna S1414.

Then, the contents playback device demodulates, plays back, and outputs the FM data received from the contents playback terminal S1416.

FIG. 14 is sequence diagrams showing a method for playing back contents through FM transmission in a CPNS environment according to another embodiment of the present invention.

Figure 15:
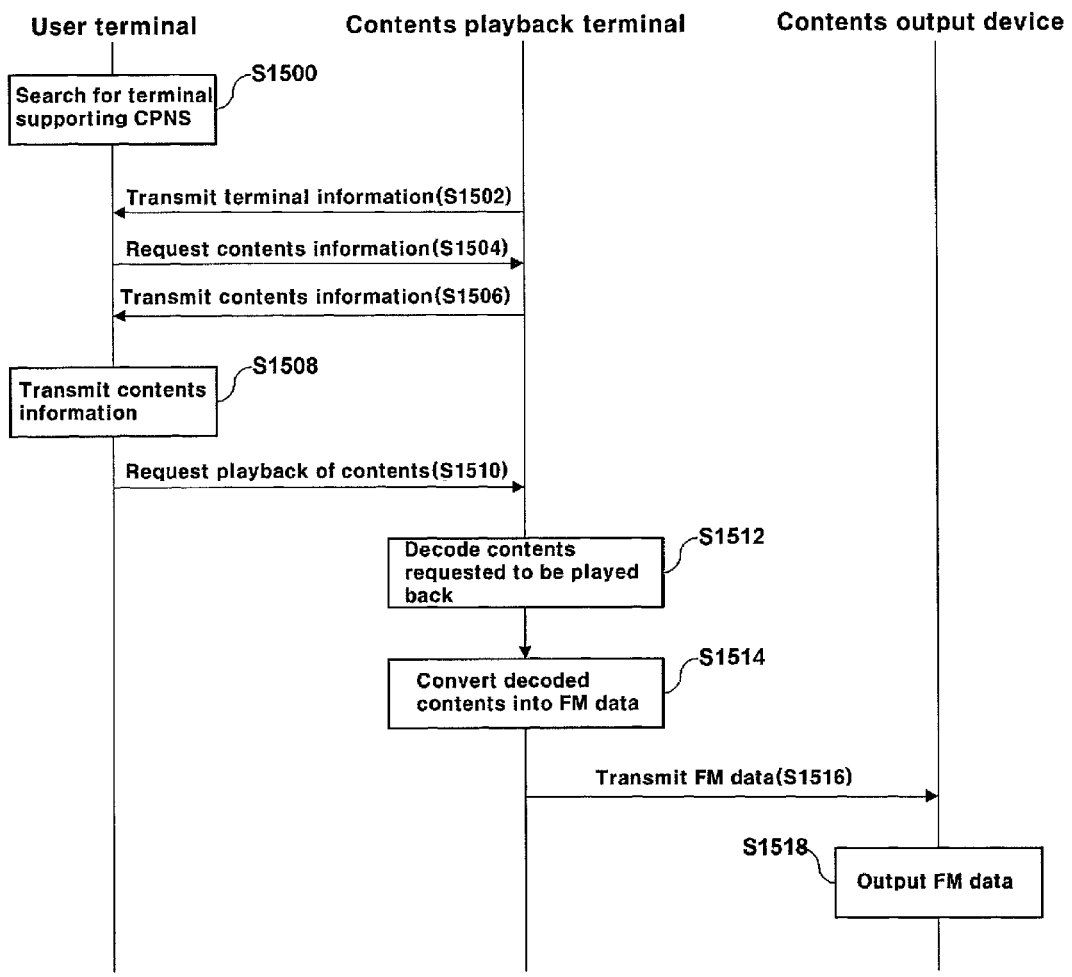

Referring to FIG. 15, the user terminal searches for a contents playback terminal supporting CPNS S1500 and receives terminal information from the searched contents playback terminal S1502.

Next, the user terminal requests contents information from the contents playback terminal selected by the user S1504, and the contents playback terminal transmits information on previously stored contents to the user terminal in response to the contents information request S1506. The contents information transmitted to the user terminal may include both a contents list and details of corresponding contents.

The user confirms the contents information received from the contents playback terminal and a list of previously stored contents and selects contents desired to be played back.

After performing step S1506, if the user selects contents desired to be played back S1508, the user terminal transmits a contents playback request signal containing information on the selected contents to the contents playback terminal S1510. Here, the contents playback request signal contains a list of contents, details of contents, and the like.

After performing step S1510, the contents playback terminal decodes corresponding contents in response to the contents playback request S410 received from the user terminal S1512. That is, the contents playback terminal determines whether the contents requested to be played back are contents downloaded from the user terminal, contents stored in the storage unit of its own, or contents streamed together with the contents playback request, and decoded corresponding contents.

After performing step S1512, the contents playback terminal converts the decoded contents into FM data S1514.

At this point, the contents playback terminal converts the decoded contents into FM data by modulating and demodulating the contents and selectively converts the contents so that the converted FM data may have a frequency band that can be received by the radio. Next, the contents playback terminal converts the FM data into a high frequency signal in order to wirelessly transmit the FM data on a selected channel and amplifies the converted high frequency FM signal to a predetermined level in order to wirelessly transmit the high frequency FM signal.

Next, the contents playback terminal transmits the amplified FM data to the contents playback device through a wireless antenna S1516.

Then, the contents playback device demodulates, plays back, and outputs the FM data received from the contents playback terminal S1518.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The system and method for outputting contents in a CPNS environment of the present invention described above is capable of sharing contents among a variety of devices through CPNS and playing back the contents in real-time, and since the contents can be shared among a variety of devices through CPNS and played back in real-time, the system and method for outputting contents is suitable when it is highly necessary to provide a user with a variety of contents and to listen to and enjoy contents of a high quality. In addition, if contents stored in the user terminal are frequency-modulated and wirelessly transmitted, the stereo system in a vehicle receives and outputs the frequency-modulated contents, and thus the system and method for outputting contents is suitable when it is highly necessary to listen to and enjoy contents of a high quality while driving a vehicle as conveniently as listening to music through a stereo system such as a radio or the like.

The invention claimed is:

1. A system for outputting contents in a converged personal network service ("CPNS") environment, the system comprising:
a user terminal for searching for a contents playback terminal supporting CPNS, sharing the contents with the contents playback terminal by receiving contents information from the searched contents playback terminal and downloading at least one piece of previously stored contents to the contents playback terminal, and requesting playback of contents selected by a user among the shared contents;
wherein the contents playback terminal shares the contents with the user terminal by connecting to the user terminal through a short-range communication network, selected from the group consisting of WiFi, Wibro, wireless LAN, Bluetooth and UWB, for decoding corresponding contents in response to a contents playback request received from the user terminal, converting the corresponding contents into frequency modulation ("FM") data, transmitting the converted FM data to a contents output device for demodulating the FM data received from the contents playback terminal and outputting the demodulated FM data in real-time.

2. The system according to claim 1, further comprising a remote control device for downloading contents stored in the user terminal to the playback terminal and for downloading the contents in the playback terminal to the user terminal or for remotely selecting contents desired to be played back.

3. The system according to claim 1, wherein the contents output device is an external speaker.

4. The system according to claim 1, wherein the contents playback terminal transmits the FM data at a specific frequency.

5. A contents playback terminal comprising:
a wireless communication unit for performing communication through a short-range communication network selected from the group consisting of WiFi, Wibro, wireless LAN, Bluetooth and UWB;
a storage unit for storing contents;
a download processing unit for downloading contents from a user terminal through the wireless communication unit and transmitting the contents stored in the storage unit to the user terminal so as to share the contents;
a decoding unit for decoding contents requested to be played back by the user terminal among the contents shared by the download processing unit;
an output interface unit for transmitting the decoded contents to a contents output device and
further comprising an FM conversion unit for converting the decoded contents from the decoding unit into frequency modulation ("FM") data at a specific frequency such that the output interface unit transmits the FM data converted by the FM conversion unit at said specific frequency.

6. The contents playback terminal according to claim 5, wherein the contents output device uses an external speaker, and the output interface unit is a stereo jack interface.

7. The contents playback terminal according to claim 5, further comprising a terminal information providing unit for providing the user terminal with terminal information through the wireless communication unit.

8. The contents playback terminal according to claim 5, wherein the decoding unit decodes the contents downloaded or streamed from the user terminal, in real-time.

9. The contents playback terminal according to claim 5, wherein the FM conversion unit converts the decoded contents into FM data by modulating and demodulating the contents and selectively converts the contents so that the converted FM data may have a frequency band that can be received by a radio, and an FM transmit unit which converts the FM data into a high frequency signal in order to wirelessly transmit the FM data on a channel selected by the FM conversion unit, amplifies the converted high frequency FM signal to a predetermined level in order to wirelessly transmit the high frequency FM signal, and transmits the amplified high frequency FM signal.

10. The contents playback terminal according to claim 5, further comprising:
an input unit for inputting a user command; and
a playback unit for decoding and outputting corresponding contents when playback of the contents is requested through the input unit.

11. The contents playback terminal according to claim 10, wherein if output of the decoded contents through an external speaker is requested, the playback unit outputs the decoded contents through the external speaker connected through the output interface unit, and if output of the decoded contents through an external speaker is not requested, the playback unit outputs the decoded contents through a speaker of its own.

12. The contents playback terminal according to claim 10, wherein the input unit is provided with a play button, a previous button, a next button, a volume up button, and a volume down button for playing back the contents stored in the storage unit.

13. The contents playback terminal according to claim 10, wherein the playback unit determines whether or not the contents playback terminal possesses the contents requested to be played back, and if the contents playback terminal possesses the contents requested to be played back, the playback unit extracts corresponding contents from the storage unit and decodes the extracted contents, whereas if the contents playback terminal does not possess the contents, the playback unit downloads the contents from the user terminal and decodes the downloaded contents.

14. A method for outputting contents in a converged personal network service ("CPNS") environment, the method comprising the steps of:
(a) searching for a contents playback terminal supporting CPNS, by a user terminal;
(b) sharing the contents with the contents playback terminal by receiving contents information from the searched contents playback terminal and downloading at least one piece previously stored contents to the contents playback terminal, by a user terminal;
(c) requesting the contents playback terminal to play back contents selected by a user among the shared contents, by the user terminal;
(d) decoding the contents requested to be played back, by the contents playback terminal;
(e) outputting the decoded contents through the contents playback terminal to a contents output device;
(f) converting the decoded contents of step (e) into frequency modulation ("FM") data,
(g) transmitting the FM data using the contents playback terminal,
(h) demodulating the FM data received from the contents playback terminal and
(i) outputting the demodulated FM data through the contents output device.

15. The method according to claim 14, wherein the contents output device is configured as an external speaker connected to the contents playback terminal through a stereo jack.

16. The method according to claim 14, wherein step (f) includes the steps of:
(f1) converting the decoded contents into FM data by modulating and demodulating the contents and selectively converting the contents so that the converted FM data may have a frequency band that can be received by a radio; and
(f2) converting the FM data into a high frequency signal in order to wirelessly transmit the FM data on a selected channel, amplifying the converted high frequency FM data to a predetermined level in order to wirelessly transmit the high frequency FM data, and transmitting the amplified high frequency FM data.

17. The method according to claim 14, wherein step (c) requests playback of the downloaded contents, requests playback of the contents selected by the user among the previously stored contents while streaming the contents, or requests playback of contents stored in the contents playback terminal.

* * * * *